United States Patent [19]

Howatt

[11] Patent Number: 5,009,443
[45] Date of Patent: Apr. 23, 1991

[54] BALL-TIP STUD AND ALIGNMENT TOOL AND METHOD OF USE

[76] Inventor: George F. Howatt, Chapin Rd., Holden, Mass. 01520

[21] Appl. No.: 458,221

[22] Filed: Dec. 28, 1989

[51] Int. Cl.$^5$ .......................... B60D 1/36; A01B 51/00
[52] U.S. Cl. .................................... 280/477; 254/131; 29/271; 172/272
[58] Field of Search .................... 280/456.1, 463, 467, 280/468, 477, 478.1, 416.2; 254/123, 131, 120; 29/271; 172/272, 439

[56] References Cited

U.S. PATENT DOCUMENTS

| | | | |
|---|---|---|---|
| 1,527,582 | 2/1925 | Falk | 254/120 |
| 3,807,767 | 4/1974 | Moline | 254/131 X |
| 3,849,012 | 11/1974 | Krouse | 29/271 X |
| 3,918,140 | 11/1975 | Konstant | 29/271 |
| 4,431,208 | 2/1984 | Geeves | 280/477 X |
| 4,759,564 | 7/1988 | Williams | 280/477 X |

Primary Examiner—David M. Mitchell
Assistant Examiner—Alan M. Kagen
Attorney, Agent, or Firm—Wolf, Greenfield & Sacks

[57] ABSTRACT

An improved stud and alignment tool which may be pivotally engaged to forcibly slide the draw bar of a hitch assembly onto the stud of an implement frame includes a stud having an elongate body and a spherical tip member attached at a first end thereof. The alignment tool has a similar elongate body and has, at a first end thereof, a cavity extending longitudinally through a portion of the tool body. The cavity is shaped so as to receive the spherical tip member of the stud, thereby releasably and pivotally coupling the alignment tool with the stud. A method for aligning a stud with a hitch assembly draw bar includes the steps of pivotally and slidably engaging the alignment tool with the draw bar, pivotally engaging the alignment tool with the stud, and pivoting the alignment tool into axial alignment with the stud while slidably forcing the draw bar off the alignment tool and about the stud.

16 Claims, 3 Drawing Sheets

BALL-TIP STUD AND ALIGNMENT TOOL AND METHOD OF USE

FIELD OF THE INVENTION

The present invention relates to devices for mechanically coupling vehicles, and, in particular, to an improved stud and alignment tool assembly which facilitates hitching a tractor to other vehicles.

BACKGROUND OF THE INVENTION

Most agricultural equipment, particularly, tractors, are fitted with a standard "three point" hitch which attaches to the tractor near the rear axel. A three point hitch comprises two bars, referred to as draw bars, and a third adjustable bar which project outward from the rear of the tractor, are movably mounted, and are spaced apart so as to define a triangular shape. Each draw bar has, at one end, an aperture in which a self aligning ball sleeve is pivotally mounted. A conventional ball sleeve has a generally ring like shape with a curved outer surface. The ball sleeve is mounted within the aperture at the end of the draw bar. This configuration allows the axis of the ball sleeve aperture to, within limitations, pivot with two degrees of freedom or any combination thereof.

The vehicle or implement to be towed, typically a grader or other piece of agricultural equipment, usually contains a standard triangular frame having two pins or studs attached at right angles to the base corners of the frame. The apex of the frame contains a set of holes into which a pin is inserted. FIG. 1 illustrates such a prior art stud 6 secured to an implement frame 8. Stud 6, which is cylindrically shaped, has a bevelled tip 6A at one end and a threaded section 6B over approximately half its length. A circular aperture 6C extends through stud 6 near end 6A for receiving a standard locking pin. Stud 6 is preferably formed of metal and is mechanically coupled to frame 8 in a conventional matter by nuts 12 and 14 and washer 16.

A tractor is typically hitched to a piece of equipment as follows. A draw bar (not shown) and stud 6 are positioned adjacent one another so as to align bevel tip 6A with the ball sleeve of the draw bar. Stud 6 is inserted into the ball sleeve and a locking pin (not shown) is inserted into pin hole 6C to securely fasten frame 8 to the draw bar. These steps are repeated until each stud of frame 8 is aligned and secured to its respective drawbar.

The task of manually aligning the studs with the ball sleeves of the draw bars is time consuming and often difficult. This difficulty is caused by the inability to accurately position the studs within even close proximity of the draw bars. Further, once the stud and draw bar are positioned adjacent one another the rigidity of the draw bar and the frame make it difficult to accurately align the ball sleeve with the axis of the stud, despite the broad angles at which the ball sleeve may be pivoted. Further, alignment of one of the two studs with its respective draw bar may misalign the other stud, particularly if it is not secured to its respective draw bars.

From the above discussion it may be appreciated that there exists a need for an apparatus and method of quickly and efficiently aligning the studs of an implement frame with the draw bars of a hitch assembly.

Accordingly, it is an object of the present invention to provide an improved stud which is more easily aligned with the draw bars of a hitch assembly than prior art studs.

A further object of the present invention is to provide a tool for aligning a stud with the draw bars of a hitch assembly.

Another object of the present invention is to provide an improved stud having a ball shaped tip which may be engaged by an alignment tool from a variety of off axis angles to align the stud with a draw bar of a hitch assembly.

A further object of the present invention is to provide an alignment tool having an internal socket at either or both ends thereof for receiving a stud having a ball shaped tip to facilitate aligning of the stud with the ball sleeve of a hitch assembly draw bar.

Another object of the present invention to provide an alignment assembly for fast and accurately aligning the studs of an implement frame with the drawbars of a hitch assembly.

Still a further object of the present invention is to provide method of aligning a stud with the draw bar of a hitch assembly which is faster and more efficient than prior art methods.

An even further object of the present invention is to provide an improved method of aligning a stud with a hitch assembly draw bar by pivotally engaging the stud with an alignment tool and slidably forcing the drawbar over the alignment tool and onto the stud.

SUMMARY OF THE INVENTION

The foregoing and other objects of the present invention are achieved with an improved stud and an alignment tool which may be pivotally engaged to forcibly slide the draw bar of a hitch assembly on to the stud of an implement frame thereby drawing the implement into alignment.

According to one embodiment of the present invention, and improved stud has an elongate cylindrical body and a spherical tip member mounted a first end thereof. The alignment tool has an elongate cylindrical body and a cavity extending longitudinally through a portion of the tool body member at a first end thereof. The cavity has a shape which is adapted to receive the spherical tip member of the improved stud, so as to pivotally engage the alignment tool with the stud.

According to another aspect of the invention, a method of rapidly aligning a stud with a draw bar having a ball-sleeve includes the steps of: providing a stud having an elongate body and a spherical tip member attached at one end thereof; providing an alignment tool having an elongate body and, at one end thereof a cavity, adapted to receive the spherical tip member; slidably and pivotally engaging the alignment tool and draw bar ball sleeve; pivotally engaging the alignment tool and stud; and positioning the alignment tool so that the body of the tool and the stud are axially aligned.

The invention will be more fully understood from the detailed description set forth below, which should be read in conjunction with the accompanying drawings.

DETAILED DESCRIPTION OF THE INVENTION

Figure 1:
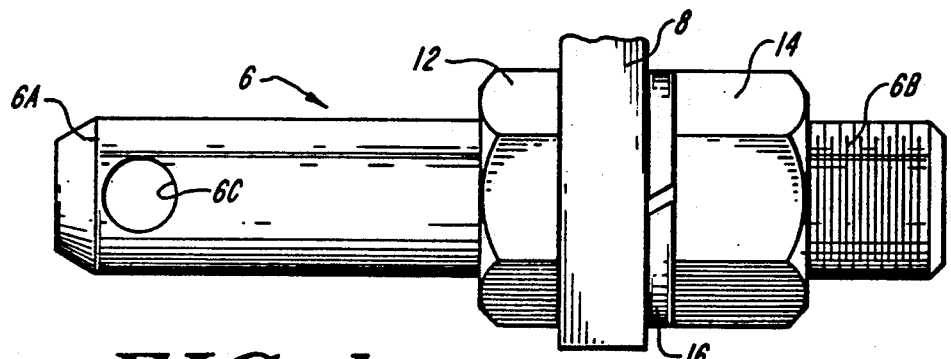
FIG. 1 is a top view of a prior art stud having a bevelled tip at one end thereof.
Figure 2:
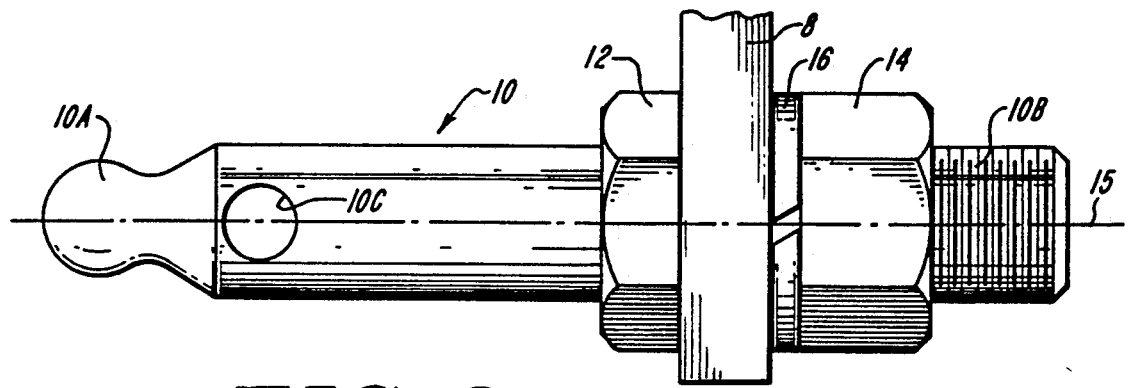
FIG. 2 is a top view of a stud according to the present invention having a ball shaped tip at one end thereof.
Figure 3:
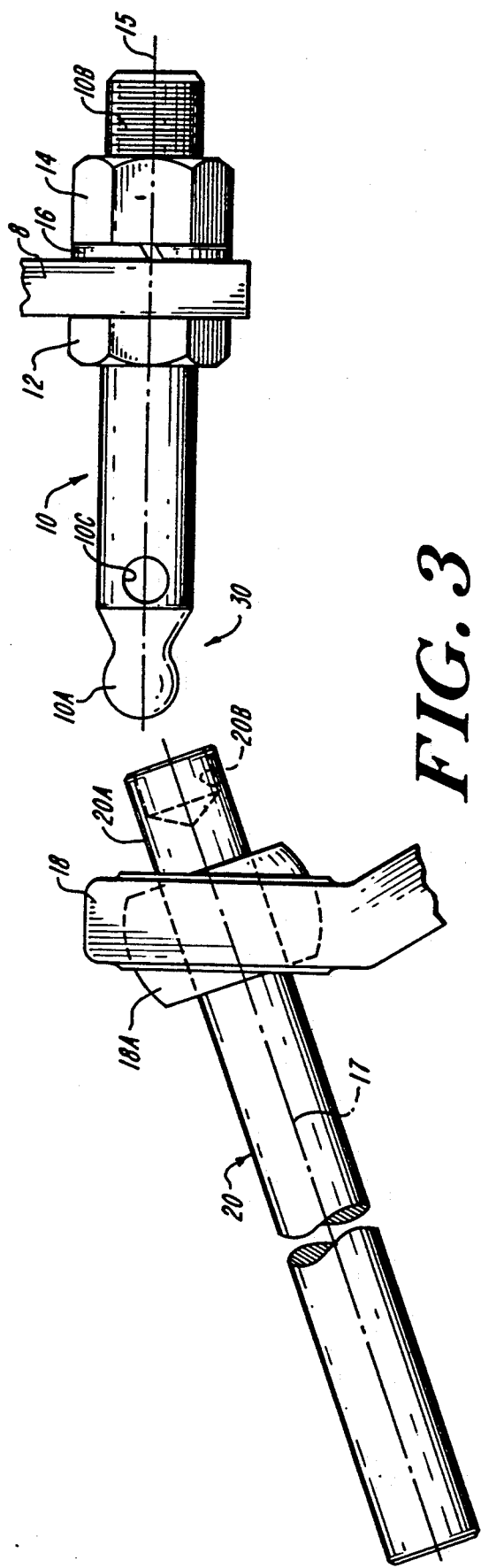
FIG. 3 is a top view of the alignment assembly of the present invention showing the stud of FIG. 2 about to be pivotally engaged by an alignment tool which is slidably mounted through a draw bar ball sleeve.

Referring to the drawings, particularly FIGS. 2 and 3, an alignment assembly for aligning a stud with a hitch assembly draw bar is illustrated.

According to one embodiment of the present invention, an alignment assembly 30 comprises an improved stud 10 and an alignment tool 20. In the preferred embodiment, illustrated in FIG. 2, stud 10 has a generally cylindrical shape extending along axis 15. A ball shaped tip 10A is attached to, and preferably, integrally formed at one end of stud 10. The diameter of ball tip 10A is slightly less than the diameter of the main body of the stud 10. A segment 10B, approximately the length of stud 10, has a exterior thread (not shown) to facilitate attachment of stud 10 to implement frame 8. A circular aperture 10C extends through stud 10 near ball tip 10A, as illustrated. Aperture 10C serves as a locking pin hole for insertion of a locking pin. Stud 10 is preferably comprised of metal.

Stud 10 is mechanically coupled to frame 8 by threading nut 12 over section 10B and inserting stud 10 into an aperture (not shown) in frame 8. Washer 16 is then placed over segment 10B until adjacent to frame 8. Nut 14 is threaded over segment 10B. Nuts 12 and 14 are then tightened to secure the stud against frame 8.

As illustrated in FIG. 3, alignment tool 20 has a generally elongate cylindrical shape extending along axis 17. A socket 20B is bored into end 20A of tool 20. In the preferred embodiment, alignment tool 20 is comprised of metal and has a length of approximately 2 ft. The diameter of tool 20 is the same as the diameter of stud 10. Socket 20B is concentrically bored into end 20A of tool 20. Socket 20B has a cylindrical shape whose diameter tapers abruptly to form a conical indentation at the extreme interior of the socket. The diameter of the cylindrical portion of socket 20B is similar to the diameter of ball tip 10A of stud 10. The diameter of socket 20B and ball tip 10A is less than that of stud 10 and tool 20 but large enough to provide strength to tool 20. The shape of socket 20B is adapted to receive ball tip 10A so as to pivotally engage tool 20 and stud 10.

Alignment of stud 10 with a draw bar occurs as follows. Referring to FIG. 3, stud 10 is secured to frame 8, as previously described. Tractor draw bar 18 is positioned in close proximity to stud 10. End 20A of alignment tool 20 is then inserted through ball sleeve 18A. Upon insertion of end 20A into ball sleeve 18A, tool 20 may slide in a reciprocating fashion through ball sleeve 18A as well as pivotally rotate to the extent permitted by the ball sleeve. Tool 20 is then slidably advanced through ball sleeve 18 so as to engage ball tip 10A of stud 10. End 20A may, if necessary, engage ball tip 10A from any of a broad range of off axis angles, as illustrated in FIG. 4.

The tool 20 is preferably formed of a material having high structural strength and rigidity. Steel and other metals commonly used for sockets of socket wrenches are preferred to provide resistance to deformation when the tool 20 forces the draw bar 18A into alignment with the stud 10. Similarly, the stud 10 is preferably of an iron or steel material.

Figure 4:
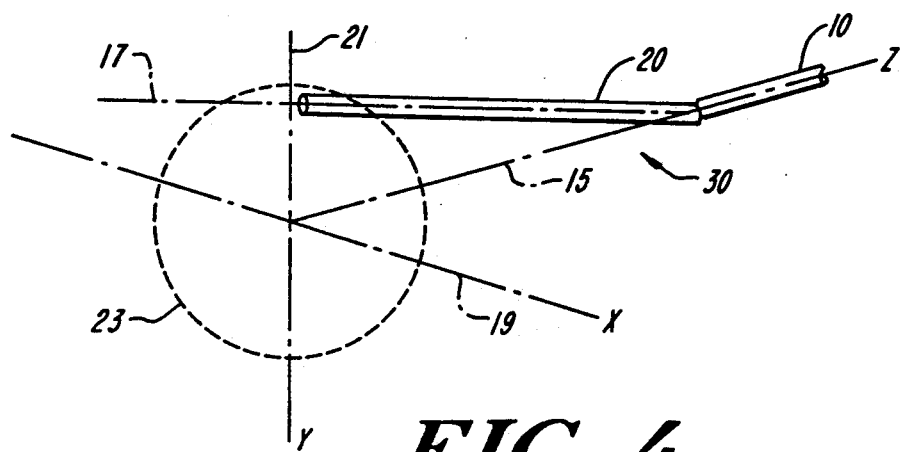
FIG. 4 is a perspective view of a coordinate system illustrating the general angles from which the alignment tool may engage the stud of FIG. 2.

In FIG. 4, axes 19, 21 and 15, form the x, y, z axes of a coordinate system, respectively. Tool 20 may engage and pivot about ball tip 10 with a first degree of freedom, defined by positions along the x axis, with a second degree of freedom, defined by positions along the y axis, or with any combination of both degrees of freedom, defined by positions within the perimeter or interior of circle 23, which lies in the x y plane. In this manner, socket 20B may engage and pivot about ball tip 10A with all the degrees of freedom of a conventional ball joint, with limitations being dependent on the diameter of ball tip 10A and socket 20B, and the general degrees of freedom permitted by ball sleeve 18A.

Figure 5:
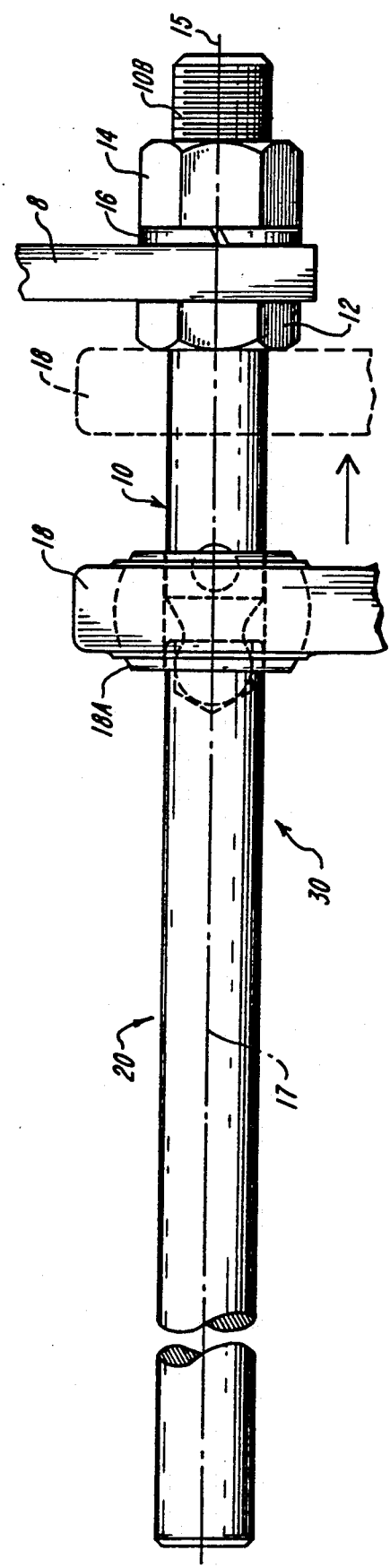
FIG. 5 is a top view of the alignment assembly of FIG. 3 illustrating the axial alignment of the alignment tool with the stud to facilitate slidably positioning the draw bar over the stud.

End 20A is advanced so that ball tip 10A is substantially received within socket 20B, thereby pivotally engaging tool 20 with stud 10 in a ball joint manner. Referring to FIG. 5, once ball tip 10A is pivotally secured within socket 20B, tool 20 is pivoted about ball tip 10A so that axis 17 of tool 20 is aligned with axis 15 of stud 10. While tool 20 is pivoted into alignment with stud 10, draw bar 18, which is movably secured to the tractor, is slidably forced off of end 20A of tool 20 and onto stud 10, coming to rest adjacent nut 12, as indicated in FIG. 5. In this manner, draw bar 18 and or implement 8 are pryed into alignment with stud 10 by the pivoting of tool 20 about ball tip 10A.

Figure 6:
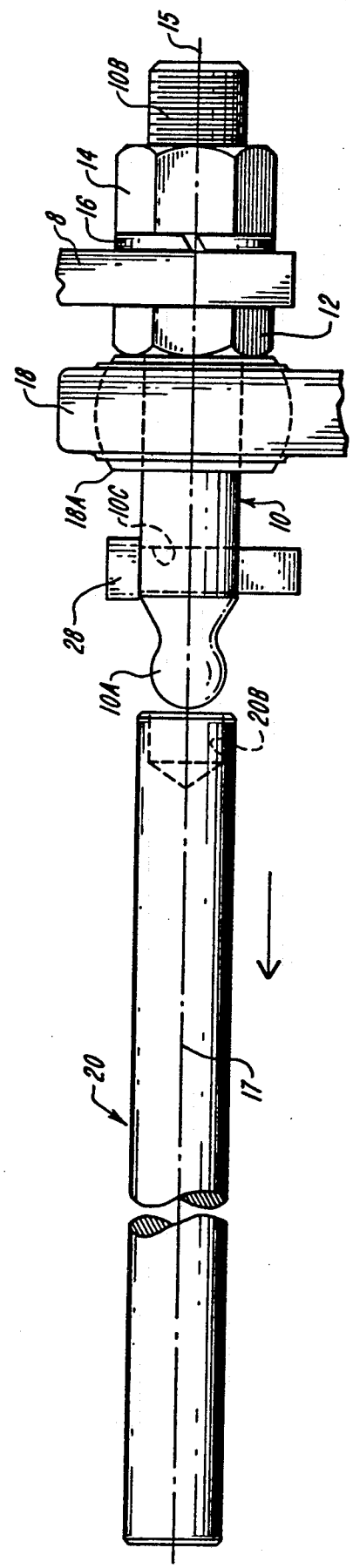
FIG. 6 is a side view of the alignment assembly of FIG. 5 illustrating the disengagement of the alignment tool from the stud and the securing of the draw bar about the stud with a locking pin.

As shown in FIG. 6, once draw bar 18 is positioned adjacent nut 12 and frame 8, a conventional locking pin 28 may be inserted through locking pin hole 10C of stud 10. Locking pin 28 may be any conventional locking pin sized to fit in locking pin hole 10C. Once a locking pin 28 secures draw bar 18 to frame 8, alignment tool 20 may be disengaged from stud 10 by simply applying an opposite force along axis 17 of tool 20. Tool 20 may then be used to align other studs having a similar design as stud 10, as needed, until the tractor or other vehicle is hitched to the towable implement.

From the foregoing it may be appreciated that the present invention provides a ball tip stud and alignment tool which may be pivotally engaged so as to force the draw bars of a hitch assembly into alignment with the frame studs of a towable implement or vehicle.

Having thus described one particular embodiment, various alterations, modifications and improvements will readily occur to those reasonably skilled in the art. For example, the ball tipped stud and alignment tool of the present invention may be used with a hitch having any number of draw bars or "points" and may be used with any vehicle, or towable implement, besides agricultural equipment. The cross-sectional profiles of the alignment tool and stud may be round, eliptical or of other geometric shapes, provided they fit within the ball sleeve of the draw bar to be mounted. Any shape which can be used with a standard hitch assembly may be utilized. In all cases it is preferred that the tool be elongated and extend along a straight line or axis. Further, the tip of the inventive stud does not have to be substantially spherical but may be any curved surface which facilitates pivotal coupling and axial alignment of the tool and the stud. Similarly, the stud tip may have any shape which mates with the tool socket so as to allow engagement and pivotal rotation with two degrees of freedom or any combination thereof. It is further within contemplation of the present invention that the end of the alignment tool may be provided with a ball tip and the free end of the stud provided with a socket for receiving the ball tip tool, thereby facilitating pivotal coupling and axial alignment of the tool and the stud.

Such alterations, modifications and improvements as are made obvious by this disclosure are intended to be part of this disclosure though not expressly stated herein, and are intended to be in the scope and spirit of the invention. Accordingly, the foregoing description is intended to be exemplary only and not limiting. The invention is limited only as defined in the following claims and equivalents thereto.

What is claimed:

1. An assembly to facilitate coupling of an implement to a hitch assembly tractor draw bar of a multi-point hitch, said assembly comprising:
   a stud forming a part of said multi-point hitch and having an elongate cylindrical body and a spherical tip member attached at a first end thereof, said stud being mechanically coupled at a second end thereof to said implement;
   an alignment tool having an elongate cylindrical body and a cavity extending longitudinally through a portion of said tool body at a first end thereof, said cavity having a shape adapted to received said spherical tip member so as to releasably and pivotally couple said stud and said alignment tool.

2. The alignment assembly of claim 1 wherein a cross-section of said stud body member and said tool body member have a substantially similar first diameter.

3. The alignment assembly of claim 2 wherein at least a portion of said spherical tip member and at least a portion of said cavity have a substantially similar second diameter.

4. The alignment assembly of claim 3 wherein said second diameter is less than said first diameter.

5. A method for aligning a stud with a hitch assembly draw bar of a multi-point hitch, said draw bar having a ball-sleeve pivotally mounted at an end thereof, said method comprising the steps of:
   providing a stud forming a part of said multi-point hitch and having an elongate cylindrical body and a spherical tip member attached at a first end thereof,
   providing an alignment tool having an elongate cylindrical body and a cavity extending longitudinally through a portion of said tool body at a first end thereof, said cavity adapted to receive and pivotally engage said spherical tip member,
   engaging said alignment tool and said draw bar ball-sleeve so that said alignment tool is slidably and pivotally coupled therewith;
   engaging said alignment tool and said stud so that said alignment tool is pivotally coupled thereto; and
   positioning said alignment tool so that said tool body and said stud body are axially aligned, and said draw bar ball-sleeve is slidably coupled with said stud body.

6. The method of claim 5 further comprising a step of attaching said stud to the frame of a vehicle.

7. The method of claim 5 wherein the step of engaging said alignment tool and said draw bar ball sleeve comprises the step of:
   inserting the first end of said alignment tool into said ball sleeve so that said alignment tool may slidably reciprocate therethrough and is pivotally coupled therewith.

8. The method of claim 5 wherein said step of engaging said alignment tool and said stud comprises the step of:
   positioning the first end of said alignment tool so that said spherical tip member is substantially received within said cavity so that said alignment tool may be pivoted about said spherical tip member.

9. The method of claim 5 wherein the step of positioning said alignment tool comprises the step of:
   pivoting said alignment tool about said spherical tip member so as to force said draw bar off of said alignment tool and about said stud.

10. An alignment tool for coupling a tractor draw bar to an implement having a multi-point hitch and carrying a stud having a spherical tip member dimensioned for rotational, releasable coupling, said tool comprising:
    a body having an elongated central axis and a first and second end, and
    means at said first end for interconnecting said tool with said stud tip, which stud tip forms a part of said multi-point hitch, in a mating releasable engagement which allows pivoting motion of said tool about said stud with at least two degrees of freedom or any combination thereof.

11. A tool in accordance with claim 10 and further comprising said stud being interengaged with said tool.

12. The combination of claim 11 wherein said stud comprises a portion of an odd numbered point attachment of an implement and said implement is an agricultural implement.

13. The combination of claim 11 wherein said means at said first end comprises a socket extending longitudinally through a portion of said tool body.

14. The combination of claim 13 wherein said stud further comprises a body member having a spherical tip member attached to one end thereof.

15. The combination of claim 11 wherein said means at said first end comprises a spherical tip member attached to said tool body.

16. The combination of claim 15 wherein said stud further comprises a body member having, at one end thereof, a socket extending partially through said body and adapted to receive said spherical tip member.

* * * * *